(12) United States Patent
Matsuoka et al.

(10) Patent No.: US 9,989,833 B2
(45) Date of Patent: Jun. 5, 2018

(54) ILLUMINATION APPARATUS AND IMAGE PICKUP SYSTEM INCLUDING THE SAME

(71) Applicant: Olympus Corporation, Hachioji-shi, Tokyo (JP)

(72) Inventors: Kei Matsuoka, Hachioji (JP); Hitoshi Yoshida, Hino (JP)

(73) Assignee: Olympus Corporation, Tokyo (JP)

(*) Notice: Subject to any disclaimer, the term of this patent is extended or adjusted under 35 U.S.C. 154(b) by 0 days. days.

(21) Appl. No.: 15/430,030

(22) Filed: Feb. 10, 2017

(65) Prior Publication Data
US 2017/0242320 A1    Aug. 24, 2017

(30) Foreign Application Priority Data

Feb. 24, 2016  (JP) ................................. 2016-033401
Feb. 24, 2016  (JP) ................................. 2016-033402

(51) Int. Cl.
*G03B 15/05*   (2006.01)
*G03B 15/03*   (2006.01)
*G03B 17/56*   (2006.01)
*G02B 5/02*    (2006.01)

(52) U.S. Cl.
CPC .......... *G03B 15/03* (2013.01); *G02B 5/0284* (2013.01); *G03B 17/565* (2013.01); *G03B 15/05* (2013.01); *G03B 2215/0503* (2013.01); *G03B 2215/0525* (2013.01); *G03B 2217/002* (2013.01)

(58) Field of Classification Search
CPC ...................................................... G03B 15/05
USPC ....................................................... 396/200
See application file for complete search history.

(56) References Cited

U.S. PATENT DOCUMENTS

| 2014/0209796 A1* | 7/2014 | Ishii ....................... G03B 15/05 250/227.11 |
| 2014/0211446 A1* | 7/2014 | Tenmyo ................. G03B 15/05 362/11 |

FOREIGN PATENT DOCUMENTS

| JP | 2005-258011 | * 11/2004 | ............. G03B 15/05 |
| JP | 2005-258011 | 9/2005 | |
| JP | 2014-142564 | * 9/2005 | ............. G02B 15/02 |
| JP | 2009-237298 | * 10/2009 | ............. G03B 15/05 |
| JP | 2014-142564 | 8/2014 | |

* cited by examiner

*Primary Examiner* — Clayton E Laballe
*Assistant Examiner* — Kevin Butler
(74) *Attorney, Agent, or Firm* — John C. Pokotylo; Pokotylo Patent Services

(57) ABSTRACT

An illumination apparatus includes: a light-guiding portion including a light-introducing opening through which light is introduced from a light-emitting portion of an image pickup apparatus, a reflective surface that reflects light introduced from the light-introducing opening toward an image pickup optical axis of the image pickup apparatus, and a diffusion portion that diffuses the light reflected by the reflective surface toward an object as diffused light; and a reflective body including an opening portion allowing an image pickup opening of the image pickup apparatus to be exposed, and a reflective portion provided around the opening portion and including a reflective surface formed to expand from the opening portion toward the object, wherein the diffusion portion is disposed at a part of the reflective portion and the reflective body includes a wall portion extending to the object side at a boundary between the opening portion and the diffusion portion.

18 Claims, 10 Drawing Sheets

ILLUMINATION APPARATUS AND IMAGE PICKUP SYSTEM INCLUDING THE SAME

CROSS REFERENCE TO RELATED APPLICATION

This application claims the benefit of Japanese Application No. 2016-33401 filed in Japan on Feb. 24, 2016, and Japanese Application No. 2016-33402 filed in Japan on Feb. 24, 2016, the contents of which are incorporated herein by this reference.

BACKGROUND OF THE INVENTION

1. Field of the Invention

The present invention relates to an illumination apparatus to be attached to an image pickup apparatus including a light-emitting portion for applying illumination light to outside, and an image pickup system including the illumination apparatus.

2. Description of Related Art

Conventionally, image pickup apparatuses having an image pickup function have been put into practical use, in which a light-emitting portion is integrally incorporated in the apparatus main body, for applying illumination light to an external object in order to obtain sufficient exposure amount when image pickup operation is performed under a low brightness environment such as night or shade, for example.

As the light-emitting portion provided in such a conventional type of image pickup apparatus, a light-emitting portion including, as a light source thereof, for example, a flashing light-emitting device using a flash discharge tube, and also including a light-emitting diode (LED) as another light source has been put into practical use.

In the case where an image pickup operation is performed with the above-described light-emitting portion by using the image pickup apparatus of such a conventional type, at the time of, what is called, a proximate image pickup in which an object as an image pickup object, in particular, is located in an extremely close area (for example, located in close range in which the distance to the object is several centimeters), there is a case where a desired object is not appropriately irradiated with the illumination light applied from the light-emitting portion. Specifically, the illumination light sometimes cannot be evenly applied to the desired object due to a structure such as a lens barrel provided on the front surface side (object side) of the image pickup apparatus interfering with the illumination light from the light-emitting portion, for example. In such a case, light amount insufficiency partly occurs in the image to be obtained.

Therefore, in recent years, Japanese Patent Application Laid-Open Publications Nos. 2005-258011, 2014-142564, and 2009-237298, for example, disclose various kinds of illumination adapters, which are illumination apparatuses as accessory apparatuses, configured to be attached to an image pickup apparatus including a light-emitting portion, to guide illumination light, which is applied from the light-emitting portion of the image pickup apparatus to outside, to the vicinity of an image pickup optical system and obtain diffused illumination light, to thereby be capable of obtaining the illumination light to be evenly applied to an object also at the time of proximate image pickup.

The illumination apparatus disclosed in each of the Japanese Patent Application Laid-Open Publications Nos. 2005-258011, 2014-142564, etc., is an illumination apparatus configured to be attached to an image pickup apparatus including a light-emitting portion using a light-emitting diode as a light source.

In addition, the illumination apparatus disclosed in the Japanese Patent Application Laid-Open Publication No. 2009-237298 is an illumination apparatus to be used by being attached to the image pickup apparatus including a flashing light-emitting device using a flash discharge tube as a light source of the light-emitting portion.

SUMMARY OF THE INVENTION

An illumination apparatus according to one aspect of the present invention includes: a light-guiding portion including a light-introducing opening through which light is introduced from a light-emitting portion provided to an image pickup apparatus, the light emitting portion being configured to apply light to an external object, a reflective surface that reflects illumination light introduced from the light-introducing opening toward an image pickup optical axis of the image pickup apparatus, and a diffusion portion that diffuses the illumination light reflected by the reflective surface toward an object side as diffused illumination light; and a reflective body including an opening portion that allows an image pickup opening of the image pickup apparatus to be exposed, and a reflective portion provided around the opening portion and including a reflective surface formed so as to expand from the opening portion toward the object side for reflecting the diffused illumination light guided from the light-guiding portion toward the object side, wherein the diffusion portion is disposed at a part of the reflective portion and the reflective body further includes a wall portion formed at a boundary between the opening portion and the diffusion portion so as to extend to the object side.

An illumination apparatus according to another aspect of the present invention includes: a reflective portion that reflects light for illuminating an object, the light being emitted from an external image pickup apparatus, as diffused light in a direction in which an image pickup optical axis of the external image pickup apparatus is located; a ring-shaped reflective body including an opening formed so as to surround the image pickup optical axis of the external image pickup apparatus and an emission surface from which the diffused light is emitted, the emission surface being formed at a part of the ring-shaped reflective body, the ring-shaped reflective body being configured to reflect the diffused light toward the object; and a light-shielding wall provided between a peripheral edge portion of the opening and the emission surface and extending in an optical axis direction.

An illumination apparatus according to another aspect of the present invention is an illumination apparatus configured to be attached to an image pickup apparatus including a light-emitting portion for applying illumination light to outside, and the illumination apparatus includes: a light-guiding unit including a light-introducing opening through which light is introduced from the light-emitting portion, a reflective portion that receives the illumination light introduced from the light-introducing opening and reflects the received illumination light toward an image pickup optical axis of the image pickup apparatus, and a diffusion portion that diffuses the illumination light reflected by the reflective portion; a reflective main body including an opening portion that allows an image pickup opening of the image pickup apparatus to be exposed, a reflective portion provided around the opening portion and including a reflective surface formed so as to expand from the opening portion toward an object side for reflecting diffused illumination light guided from the light-guiding unit toward the object side, a cutout portion formed by cutting a part of the reflective portion so as to dispose the diffusion portion, and a rib-shaped wall portion formed at a boundary between the opening portion and the cutout portion so as to extend to the object side.

An image pickup system according to one aspect of the present invention is an image pickup system configured by an image pickup apparatus and an illumination apparatus configured to be attachable to and detachable from the image pickup apparatus, the image pickup system includes: an image pickup apparatus including, on a front surface thereof, a photographing optical system and a light-emission window for object illumination; and an illumination apparatus including: a light-guiding unit including a light-introducing opening through which illumination light from the light-emitting portion is introduced, a reflective portion that receives the illumination light introduced from the light-introducing opening and reflects the received illumination light toward an image pickup optical axis of the image pickup apparatus, and a diffusion portion that diffuses the illumination light reflected by the reflective portion; and a reflective main body including an opening portion that allows an image pickup opening of the image pickup apparatus to be exposed, a reflective portion provided around the opening portion and including a reflective surface formed so as to expand from the opening portion toward an object side for reflecting diffused illumination light guided from the light-guiding unit toward the object side, a cutout portion formed by cutting a part of the reflective portion so as to dispose the diffusion portion, and a rib-shaped wall portion formed at a boundary between the opening portion and the cutout portion so as to extend to the object side.

The benefit of the present invention will be more readily apparent from the following detailed description.

DETAILED DESCRIPTION OF THE PREFERRED EMBODIMENTS

Figure 1:
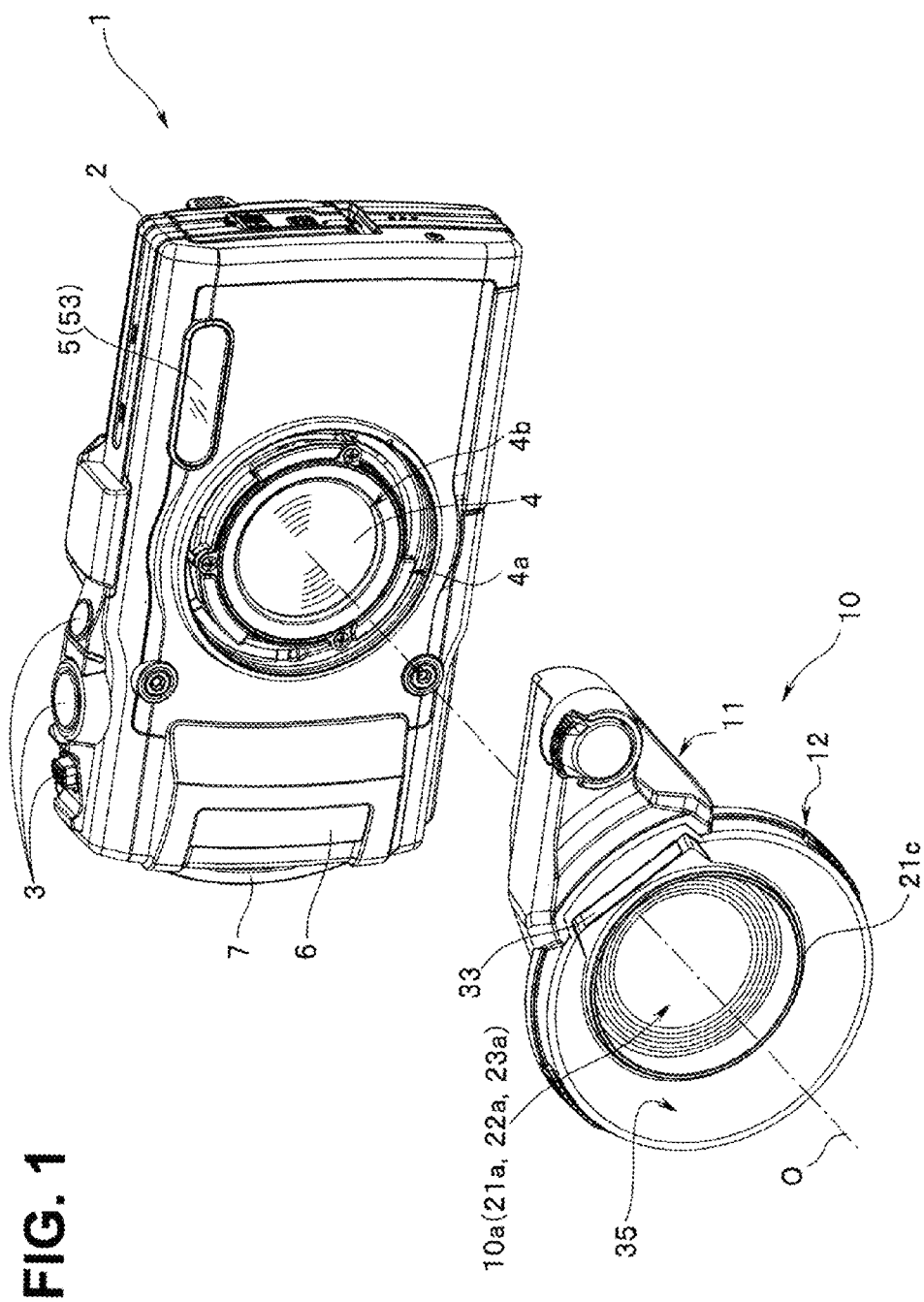
FIG. 1 is an appearance perspective view showing an illumination apparatus according to an embodiment of the present invention and an image pickup apparatus which can be used with the illumination apparatus attached thereto.

Hereinafter, description will be made on the present invention with reference to embodiments shown in the drawings. Each of the drawings used in the description below is a pattern diagram, and there is a case where a different dimensional relationship and a different scale size is used for each of the components in order to allow each of the components to be illustrated in a recognizable size in the drawings. Therefore, the present invention is not limited to the embodiments shown in the drawings, with regard to the number, shapes, ratio of the sizes of the components, and a relative positional relationship among the components shown in these drawings.

An embodiment of the present invention exemplifies an illumination adapter which is an illumination apparatus to be attached to an image pickup apparatus (what is called a digital camera, etc.) configured to sequentially perform photoelectric conversion on optical images formed by an image pickup optical system using a photoelectric conversion device (for example CCD (charge coupled device) image sensor, CMOS (complementary metal oxide semiconductor) image sensor, etc., (hereinafter referred to as image pickup device), and record the image signal obtained by the photoelectric conversion as image data of a predetermined format (digital image data representing a still image or a moving image, for example) in a storage medium, and including an image display apparatus (for example, liquid crystal display: LCD, organic electro-luminescence: OEL display, or the like) that reproduces and displays a still image or a moving image based on the digital image data recorded in the storage medium, and further integrally including, in the apparatus main body, a light-emitting portion for applying illumination light to outside, and an image pickup system including the illumination apparatus (illumination adapter).

Note that an image pickup optical axis of an image pickup optical system is denoted by a reference sign O in the present embodiment. As the image pickup optical system of the image pickup apparatus exemplified in the present embodiment, a bending optical system is employed, in which, for example, a prism or the like is provided on an optical path of light entered from an object side to reach the image pickup device, and the optical path (optical axis) of the image pickup optical system is bent by 90 degrees through the use of the prism or the like. Therefore, the optical axis of the image pickup optical system includes the optical axis in the direction along the optical path entered from the object side and the optical axis in the direction along the optical path bent by the prism to advance toward the image pickup device. The image pickup optical axis denoted by the reference sign O in the description below is the former, that is, the optical axis along the optical path entered from the object side.

In addition, in the image pickup apparatus according to the present embodiment, the surface opposed to the object in the direction along the image pickup optical axis O (hereinafter, just referred to as the optical axis O) at the time of using the image pickup apparatus is referred to as a front surface of the image pickup apparatus. Similarly, the surface facing the user in the direction along the optical axis O at the time of using the image pickup apparatus is referred to as a rear surface of the image pickup apparatus. Furthermore, the surface on which a shutter release button among operation members of the image pickup apparatus is disposed is referred to as a top surface of the image pickup apparatus. In addition, the surface opposed to the top surface of the image pickup apparatus is referred to as a bottom surface of the image pickup apparatus. Furthermore, surfaces located on both sides of the image pickup apparatus in the normal usage state are referred to as a left side surface and a right side surface. The discrimination of the left and right in this case is determined by defining the left side or right side when viewing the image pickup apparatus from the object side so as to face the front surface of the image pickup apparatus as the left or the right.

Figure 2:
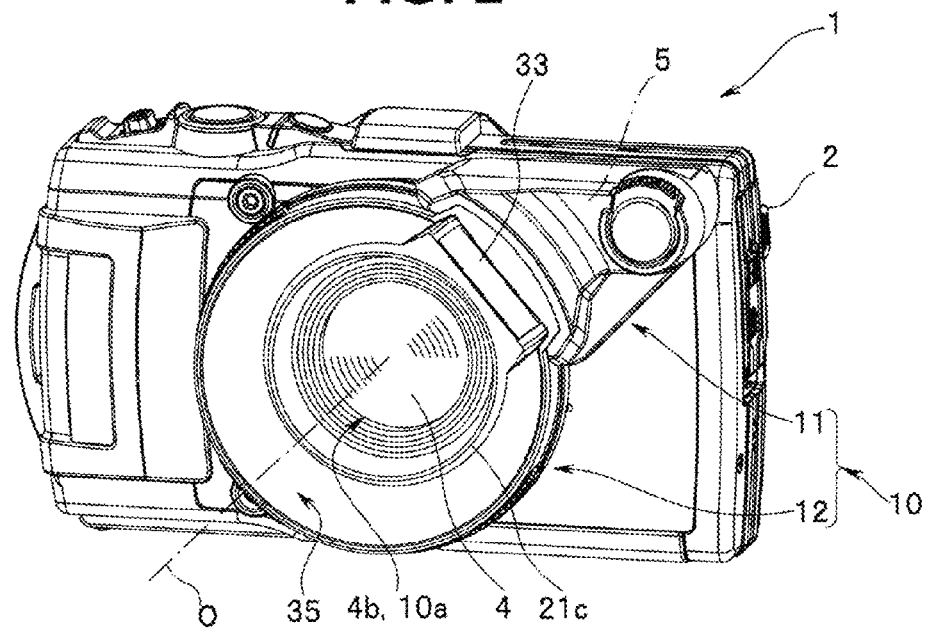
FIG. 2 is an appearance perspective view showing a mounting state between the illumination apparatus according to the embodiment of the present invention and the image pickup apparatus.
Figure 3:
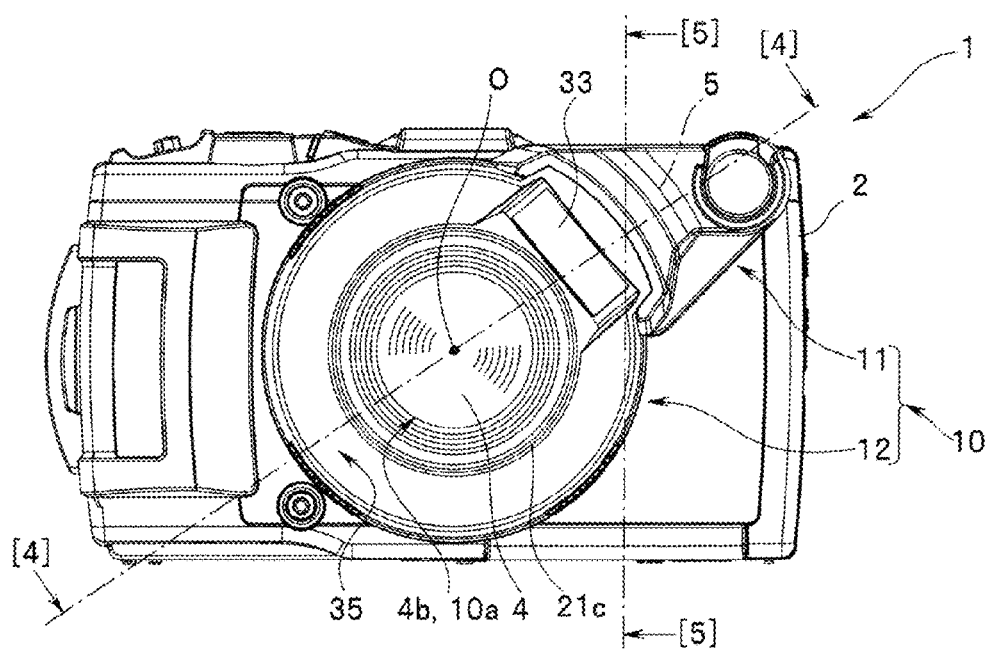
FIG. 3 is a front view of a mounting state between the illumination apparatus according to the embodiment of the present invention and the image pickup apparatus.

FIGS. 1, 2, and 3 are appearance views showing the illumination apparatus according to the embodiment of the present invention and the image pickup apparatus which can be used with the illumination apparatus attached thereto. Among these figures, FIG. 1 is an appearance perspective view showing the state where the illumination apparatus according to the present embodiment is detached from the image pickup apparatus. In addition, FIGS. 2 and 3 show the state where the illumination apparatus according to the present embodiment is mounted to the image pickup apparatus. FIG. 2 is a perspective view. In addition, FIG. 3 is a front view viewed from the front surface side of the image pickup apparatus.

Figure 4:
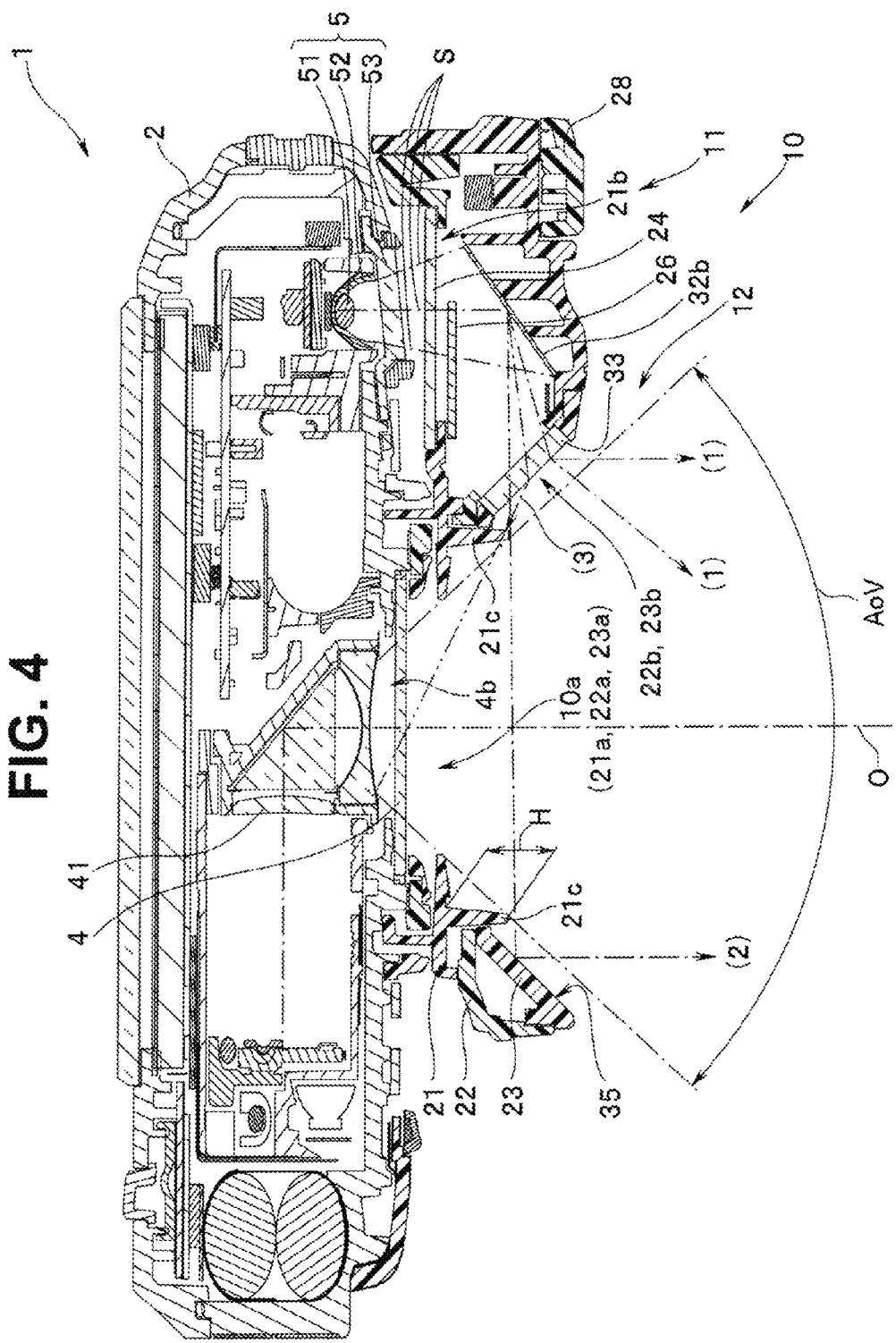
FIG. 4 is a cross-sectional view taken along the line [4]-[4] in FIG. 3.
Figure 5:
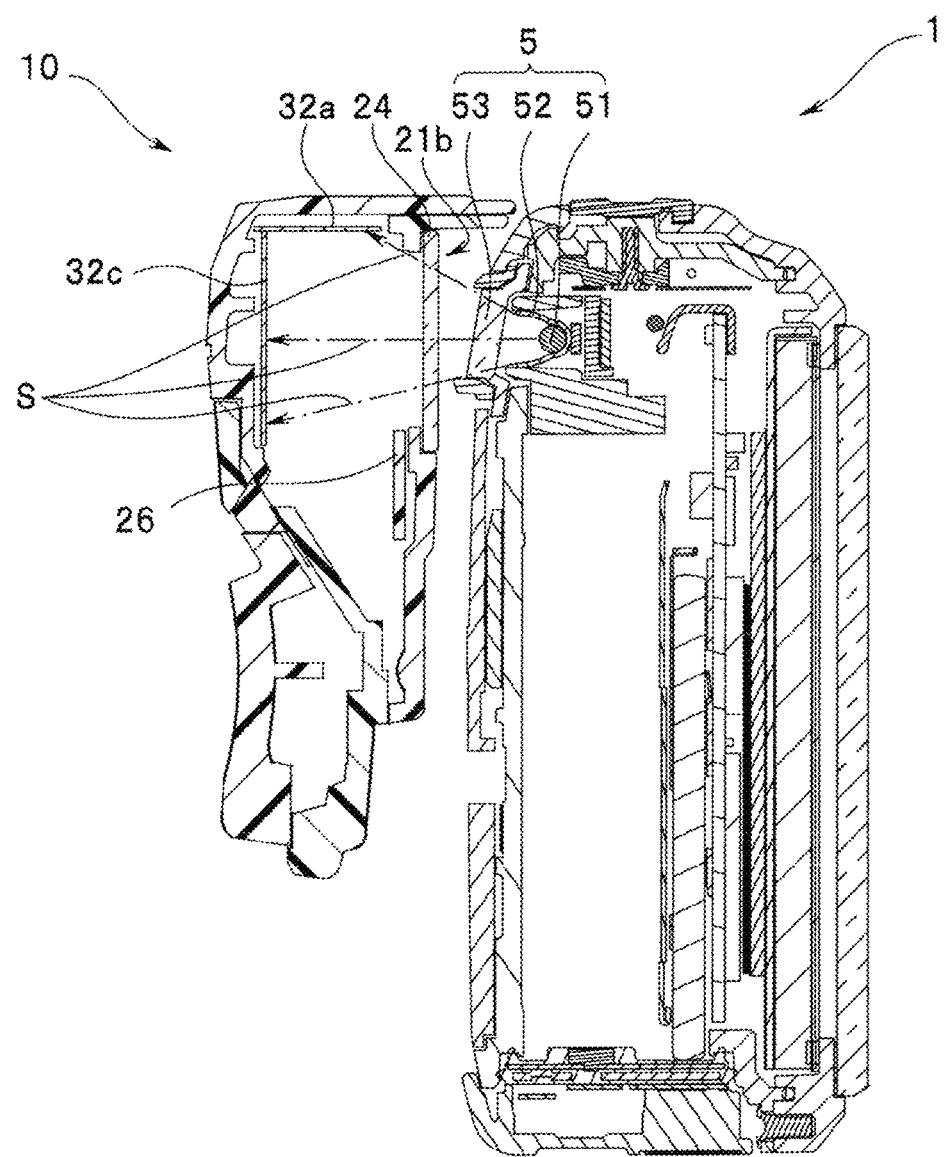
FIG. 5 is a cross-sectional view taken along the line [5]-[5] in FIG. 3 (full open state of a light-shielding member).

FIGS. 4 and 5 are cross-sectional views of the state where the illumination apparatus according to the present embodiment is mounted to the image pickup apparatus (states illustrated in FIGS. 2 and 3). FIG. 4 shows the cross section taken along the [4]-[4] line in FIG. 3. In addition, FIG. 5 shows the cross section taken along [5]-[5] line in FIG. 3.

Figure 6:
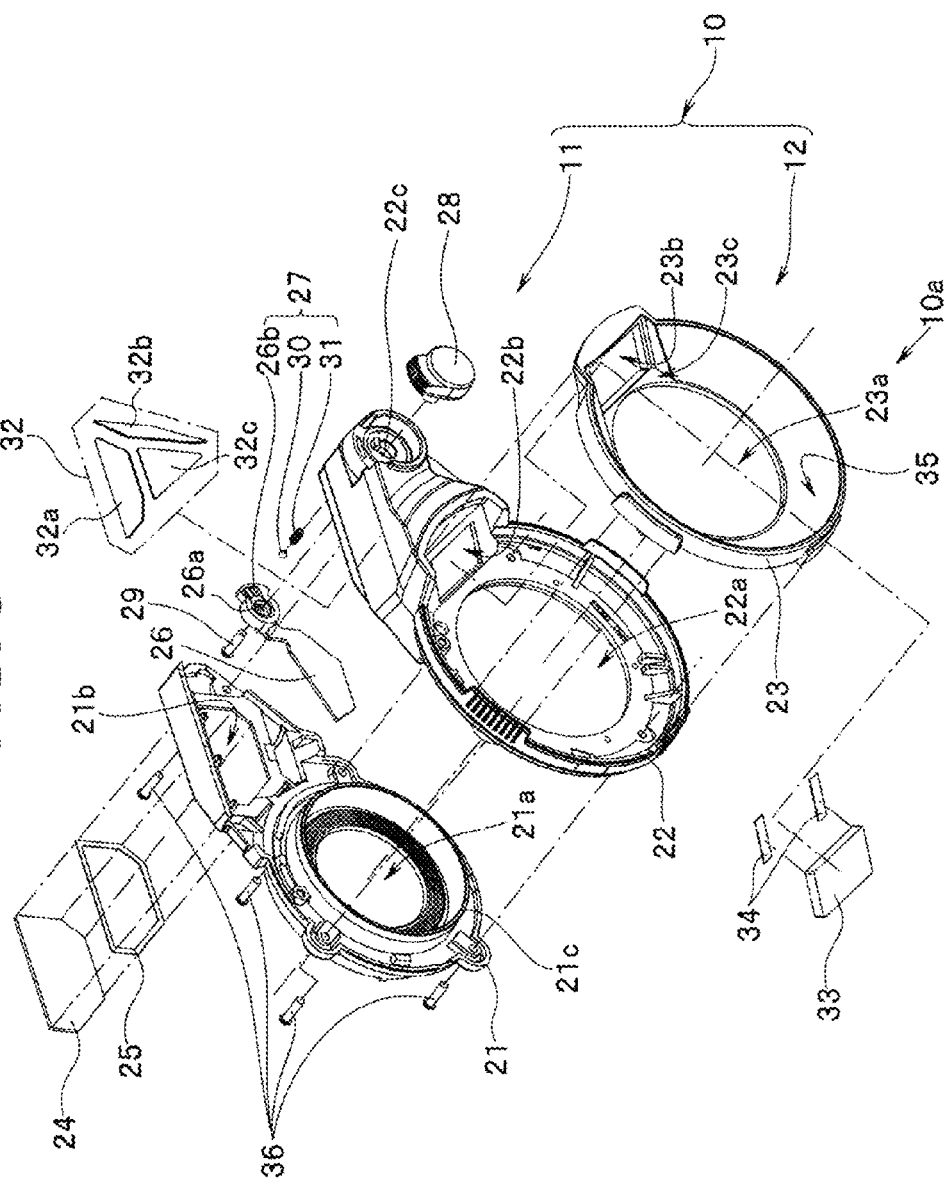
FIG. 6 is an exploded perspective view showing the illumination apparatus according to the embodiment of the present invention in an exploded manner.
Figure 7:
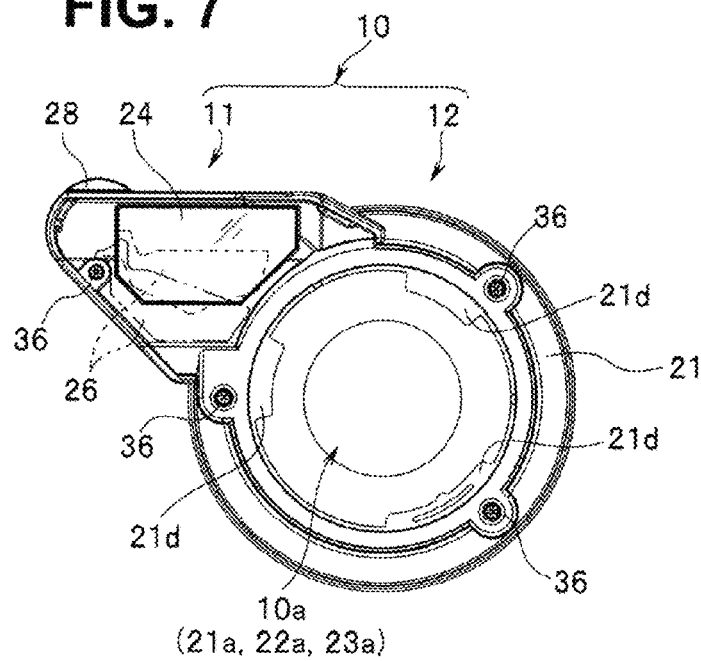
FIG. 7 is a plan view of the illumination apparatus in FIG. 6 viewed from a rear surface side.
Figure 8:
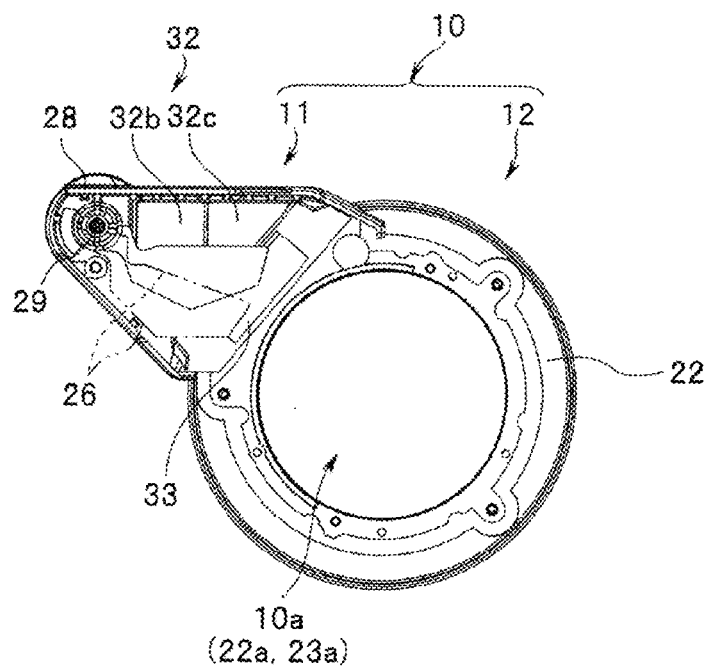
FIG. 8 is a plan view showing a state where a part of constituent members (mount member) is detached from the illumination apparatus in FIG. 6, which is viewed from the rear surface side.
Figure 9:
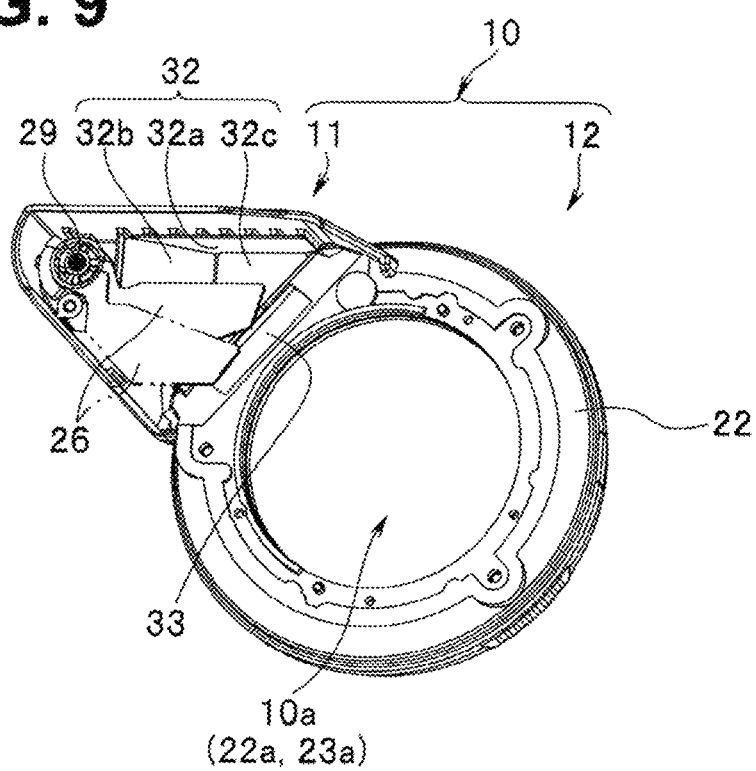
FIG. 9 is a perspective view of the state in FIG. 8 viewed from the rear surface side of the illumination apparatus.

FIGS. 6 to 9 illustrate the illumination apparatus according to the present embodiment. Among these drawings, FIG. 6 is an exploded perspective view showing the illumination apparatus according to the present embodiment in an exploded manner. FIG. 7 is a plan view of the illumination apparatus according to the present embodiment when viewed from the rear surface side. FIG. 8 is a plan view showing a state where a part of constituent members (mount member) is detached from the illumination apparatus according to the present embodiment, which is viewed from the rear surface side. FIG. 9 is a rear perspective view of FIG. 8.

Figure 10:
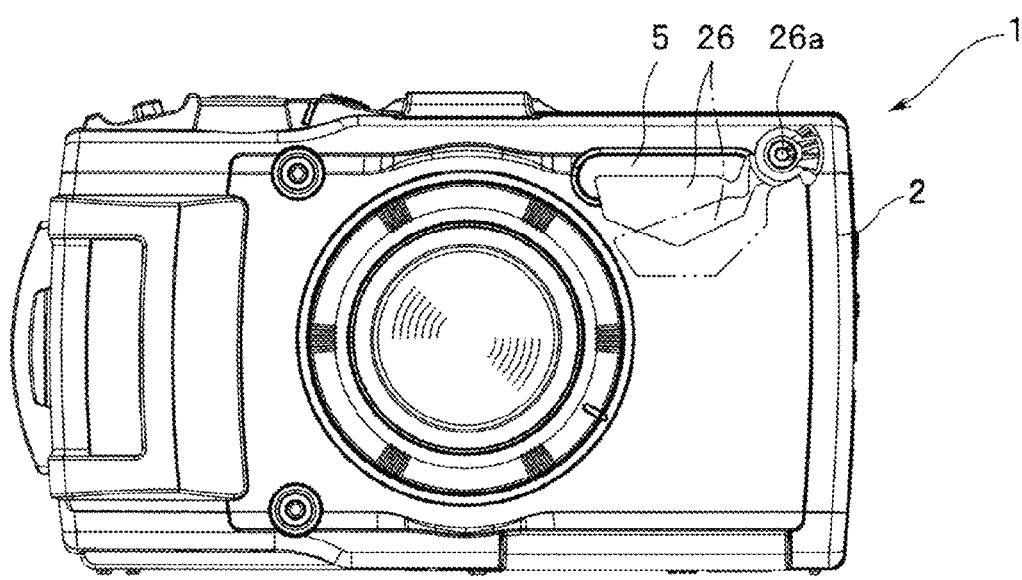
FIG. 10 is a conceptual view showing an operation range of the light-shielding member of the illumination apparatus according to the embodiment of the present invention.
Figure 11:
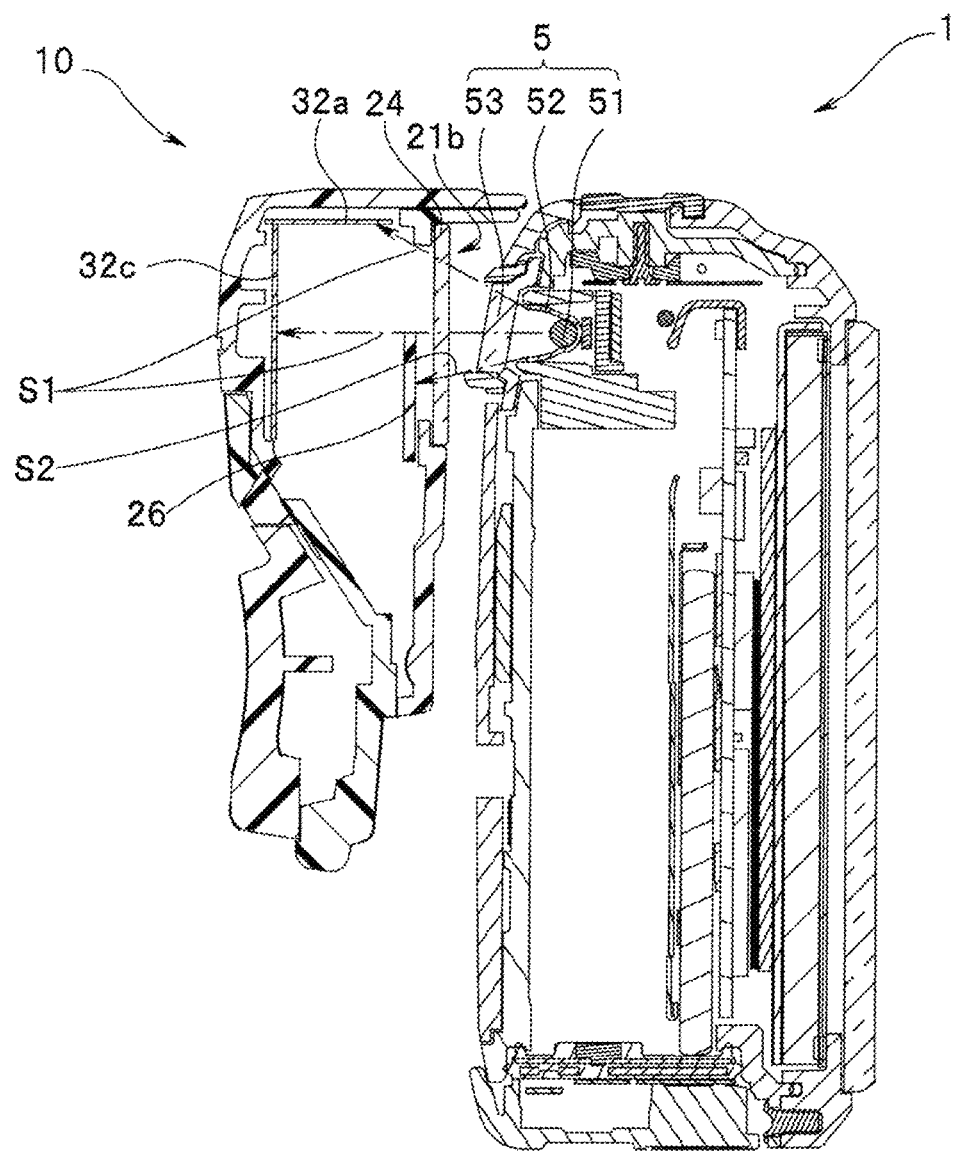
FIG. 11 is a cross-sectional view taken along the line [5]-[5] in FIG. 3 (half-light-shielding state of the light-shielding member).

FIG. 10 conceptually shows the moving range of the light-shielding member in the illumination apparatus according to the present embodiment. Note that FIG. 10 conceptually shows the arrangement of only the light-shielding member in the case where the illumination apparatus according to the present embodiment is attached to the image pickup apparatus. FIG. 11 shows the cross section taken along the [5]-[5] line in FIG. 3, similarly as the above-described FIG. 5. Note that FIG. 5 shows the full-open state of the light-shielding member. FIG. 11 shows the half-light-shielding state of the light-shielding member.

Figure 12:
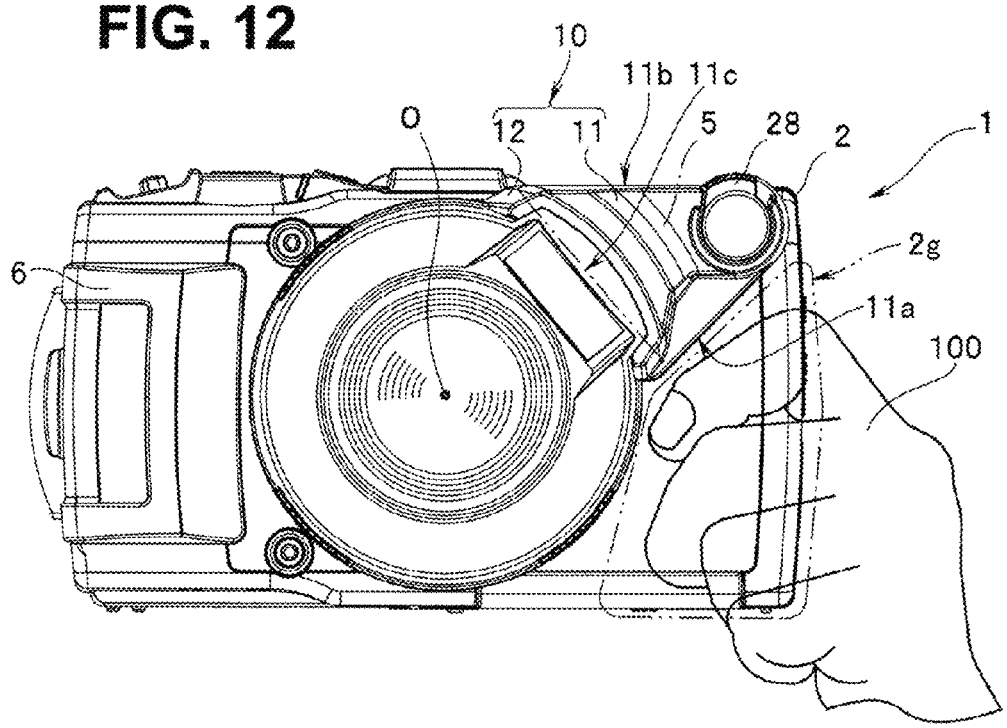
FIG. 12 is a conceptual view showing a state where a user holds the image pickup apparatus when using the image pickup apparatus to which the illumination apparatus according to the embodiment of the present invention is attached, which is viewed from a front surface side.

FIG. 12 is a conceptual view showing a state where a user holds the image pickup apparatus when using the image pickup apparatus to which the illumination apparatus according to the present embodiment of the present invention is attached, which is viewed from the front surface side.

First, description will be made on the schematic configuration of the image pickup system configured by the illumination apparatus according to the one embodiment of the present invention and the image pickup apparatus that can be used with the illumination apparatus attached thereto, with reference to mainly FIGS. 1 to 3.

An illumination adapter 10 as the illumination apparatus according to the present embodiment is used by being attached to an image pickup apparatus 1 including a light-emitting portion 5 for applying illumination light to outside.

The image pickup apparatus 1 to which the illumination adapter 10 according to the present embodiment is attached is configured by housing various kinds of constituent members inside a housing 2, the whole shape of which is formed in a substantially rectangular box shape, as shown in FIG. 1. The housing 2 includes, at the substantially center portion of the front surface thereof, an image pickup opening 4b. The image pickup opening 4b is an opening for introducing a light flux contributing to image pickup to the inside of the housing 2. To this end, the relative position of the image pickup opening 4b with respect to an image pickup optical system 41 is defined such that the optical axis O of the image pickup optical system 41 (not shown in FIGS. 1 to 3, see FIG. 4) disposed inside the housing 2 passes through substantially the center of the image pickup opening 4b.

The image pickup opening 4b is provided with a protective window member 4 configured by a transparent member made of thin planar glass or acrylic resin. The protective window member 4 allows the image pickup light flux to pass through to the image pickup optical system 41 and has a function to protect the constituent members such as the image pickup optical system 41 inside the housing 2.

The image pickup apparatus 1 includes, at the outer peripheral edge portion of the image pickup opening 4b on the front surface, an accessory attachment mount portion 4a for attaching various kinds of accessory devices such as the illumination adapter 10 according to the present embodiment to the image pickup apparatus 1 (see FIG. 1, not shown in FIGS. 2 and 3). As the accessory attachment mount portion 4a, a bayonet type mount or a screw type mount is employed, for example. In the present embodiment, the accessory attachment mount portion is illustrated by taking the bayonet type mount as an example (see FIG. 1).

In addition, the image pickup apparatus 1 includes the light-emitting portion 5 in the vicinity of one corner portion located close to the right top surface. The light-emitting portion 5 is, what is called, a flashing light-emitting device including, for example, a flash discharge tube 51, an illumination light reflector 52 (reflecting umbrella), a substantially rectangular-shaped illumination light radiation window 53, and the like (see FIG. 4, etc.).

The illumination light radiation window 53 of the light-emitting portion 5 is arranged on the front surface of the image pickup apparatus 1 so as to be flush with the outer surface. The illumination light radiation window 53 is made of substantially transparent resin member so as to allow the illumination light to transmit, and the inner surface of the illumination light radiation window 53 is subjected to a predetermined surface finishing processing so that the illumination light generated by the light emission of the flash discharge tube 51 can be diffused in a predetermined application range. The illumination light radiation window 53 includes inside thereof the illumination light reflector 52 (reflecting umbrella), and the flash discharge tube 51 is arranged at substantially the center of the illumination light reflector 52. The illumination light reflector 52 is formed so as to reflect the illumination light generated by the light emission of the flash discharge tube 51 toward a predetermined one direction (that is, the direction of the illumination light radiation window 53 on the front surface side). Note that, since the configuration of the flashing light-emitting device itself is the same as that of the conventional device which has been put into practical use, further detailed description will be omitted. The present flashing light-emitting device includes a cylindrical-shaped discharge tube, and the rectangular-shaped reflector constituted of a pair of reflective surfaces for reflecting the flash emitted from the discharge tube to the object side.

The image pickup apparatus 1, on one hand, includes on the top surface thereof a plurality of operation members 3. The plurality of operation members 3 include a power source button for performing power source on/off operation, and a release button for performing shutter release operation, and in addition, a zoom lever for performing zooming operation, for example.

The image pickup apparatus 1, on the other hand, includes at the position closer to the left side on the front surface, a grip portion 6 disposed so as to cover the left side surface from the leftward region of the front surface. In addition, the image pickup apparatus 1 includes, on the left side surface thereof, a strap attaching portion 7 for attaching a strap or the like. Other configurations of the image pickup apparatus 1 are the same as those of the conventional apparatus.

The illumination adapter 10 according to the present embodiment that is attached to the image pickup apparatus 1 of such a type is connected to the accessory attachment mount portion 4a of the image pickup apparatus 1 with bayonet coupling. Therefore, the illumination adapter 10 includes, on the rear surface side thereof, a bayonet claw 21d (not shown in FIG. 1, etc., see FIG. 7) adaptable to the accessory attachment mount portion 4a of the image pickup apparatus 1.

The illumination adapter 10 according to the present embodiment is configured by light-guiding means 11 as a light-guiding portion that introduces the illumination light from the light-emitting portion 5, reflects the illumination light toward the side where the photographing optical axis O of the image pickup apparatus 1 is located, to diffuse the reflected light to convert the reflected light into diffused illumination light, and a reflective main body 12 as a reflective body that reflects the diffused illumination light guided from the light-guiding means 11 toward the object side (forward) and shields the incidence of the diffused illumination light to the image pickup optical system 41.

Though detailed description will be made later, the light-guiding means 11 includes a reflective member 32 (not shown in FIG. 1; see FIG. 6) that reflects the illumination light, a diffusion plate 33 which is a diffusion member and a diffusion portion that diffuses the reflected light to convert the reflected light into the diffused illumination light, and the like. In addition, the reflective main body 12 includes an opening portion 10a that allows the image pickup opening 4b to be exposed, a tapered reflective surface 35 that reflects the diffused illumination light to the object side (forward), a wall portion 21c as a shielding wall that shields the diffused illumination light to the image pickup optical system 41.

In the state where the illumination adapter 10 according to the present embodiment is attached to the image pickup apparatus 1, the light-guiding means 11 is arranged so as to cover the light-emitting portion 5 of the image pickup apparatus 1, and the reflective main body 12 is attached around the image pickup opening 4b of the image pickup apparatus 1. The mounting state is the state shown in FIGS. 2 and 3.

Next, the detailed configuration of the illumination adapter 10 according to the present embodiment will be described with reference mainly to FIGS. 4 to 9 (see FIG. 6, in particular).

The illumination adapter 10 of the present embodiment is mainly configured by the light-guiding means 11 and the reflective main body 12, as described above.

The light-guiding means 11 has substantially a triangular shape when viewed from the front surface side (see FIG. 3), and includes, as the main constituent member, a housing portion having a thickness in the front-rear direction when mounted to the image pickup apparatus 1 and including a space inside.

The reflective main body 12 includes, at substantially the center thereof, an opening portion 10a and formed in a circular ring shape as a whole, and further includes the tapered reflective surface 35 whose diameter is expanded from the peripheral edge of the opening portion 10a toward the object side.

The entirety of the illumination adapter 10 according to the present embodiment is formed by combining a plurality of constituent members such that the light-guiding means 11 and the reflective main body 12 are unified as one body. Hereinafter, the configuration of the illumination adapter 10 will be specifically described.

That is, the basic part of the illumination adapter 10 is configured by a plurality of constituent members including a mount member 21, a main body member 22, and a circular-ring-shaped reflective member 23 as a reflective portion. The light-guiding means 11 is mainly configured by a part of the mount member 21 and a part of the main body member 22. The reflective main body 12 is mainly configured by a part of the mount member 21, a part of the main body member 22, and the circular-ring-shaped reflective member 23.

The mount member 21 includes a light-introducing opening 21b which is a part of the light-guiding means 11, and an opening 21a (same as the opening portion 10a) and the wall portion 21c which are a part of the reflective main body 12, and further includes, on the rear surface side, the bayonet claw 21d (see FIG. 7) for ensuring the connection with the image pickup apparatus 1.

The main body member 22 is configured by the housing portion that constitutes a part of the light-guiding means 11 and the circular-ring-shaped portion that constitutes a part of the reflective main body 12. The housing portion is a structure including inside thereof the reflective member 32, the diffusion plate 33 (diffusion portion) and the like, and also includes an opening portion 22b that allows the illumination light guided from the light-guiding means 11 to the reflective main body 12 to pass through and fixes and supports the diffusion plate 33. In addition, the circular-ring-shaped portion is a structure having the opening 22a (same as the opening portion 10a) at substantially the center part thereof, and the housing portion (light-guiding means 11) integrally held at a part of the outer peripheral edge portion.

The circular-ring-shaped reflective member 23 is a reflective portion including an opening 23a (same as the opening portion 10a) and the tapered reflective surface 35 for reflecting the diffused illumination light guided from the light-guiding means 11 toward the object side. Note that, though detailed description will be made later, the diffusion plate 33 of the light-guiding means 11 is disposed at a part of the reflective surface 35 of the circular-ring-shaped reflective member 23 so as to be exposed. In addition, the wall portion 21c of the mount member 21 is disposed around the opening 23a of the circular-ring-shaped reflective member 23 so as to extend toward the object side (forward).

The mount member 21 and the main body member 22 are unified by being fastened and fixed to each other with a plurality of screws 36, for example. In addition, the main body member 22 and the circular-ring-shaped reflective member 23 are connected to each other so as to be unified through the use of mechanical joining means such as snap-fit, for example.

Detailed description will be made on each of the components. The housing portion, which is a main part constituting member of the light-guiding means 11, is configured by a part of the mount member 21 and a part of the main body member 22, as described above. The housing portion of the light-guiding means 11 is provided with the substantially rectangular-shaped light-introducing opening 21b for introducing the illumination light from the light-emitting portion 5. The light-introducing opening 21b is formed at the mount member 21.

Therefore, when the illumination adapter 10 is attached to the image pickup apparatus 1, the light-guiding means 11 is arranged on the front surface of the image pickup apparatus 1 so as to cover the light-emitting portion 5. In this case, the light-introducing opening 21b is arranged so as to be opposed to the illumination light radiation window 53. The light-introducing opening 21b is arranged such that the application direction (that is, forward direction and which is substantially parallel to the optical axis O) of the illumination light emitted from the illumination light radiation window 53 substantially coincides with the light-introducing opening 21b. That is, the illumination light emitted from the illumination light radiation window 53 of the light-emitting portion 5 is introduced from the light-introducing opening 21b into the light-guiding means 11.

The light-introducing opening 21b is provided with a protective plate 24 configured by a transparent or semi-transparent member made of thin planar glass or acrylic resin. The protective plate 24 is a member having a function for protecting the inner constituent member of the light-guiding means 11. The protective plate 24 is fixed to the peripheral edge portion of the light-introducing opening 21b of the mount member 21 by using a sticking member such as a double-sided tape 25, for example.

The light-guiding means 11 includes, in the housing portion thereof, the reflective member 32 (reflective surface) made of a plurality of reflective plates (32a, 32b, 32c). The reflective member 32 is provided in the main body member 22. That is, inside the housing portion of the light-guiding means 11, the reflective member 32 configured by the thin planar resin member subjected to surface finishing processing (mirror finish, for example) so as to enable the light to be reflected is provided on the wall surface opposed to the light-introducing opening 21b and the top surface side wall surface.

The reflective member 32 is a member for reflecting the illumination light introduced from the light-introducing opening 21b toward the side where the photographing optical axis O of the image pickup apparatus 1 is located. The reflective member 32 is constituted of a plurality of reflective plates (three reflective plates 32a, 32b, and 32c in the present embodiment; see FIGS. 6, 8, and 9). It is needless to say that, among the inner wall surfaces of the housing portion of the light-guiding means 11, the wall surface of the part on which the reflective member 32 is disposed may be subjected to surface finishing processing such as silver plating, for example, instead of the configuration in which the reflective member 32 is constituted of the plurality of reflective plates.

Specifically, the first reflective plate 32a is provided on the top surface side wall surface in the housing portion of the light-guiding means 11 such that the reflective surface is directed to the lower surface side (see FIG. 5), and the second reflective plate 32b and the third reflective plate 32c are provided on the wall surfaces facing the surface along the light-introducing opening 21b in the housing portion. The second reflective plate 32b is disposed on a part of the wall surface facing the surface along the light-introducing opening 21b such that the reflective surface has a predetermined inclination with respect to the light-introducing opening 21b (see FIGS. 4 and 9). In this case, the second reflective plate 32b is disposed such that the reflective surface has the predetermined inclination with respect to the side where the photographing optical axis O of the image pickup apparatus 1 is located (see FIGS. 4 and 9). In addition, the third reflective plate 32c is arranged on a part of the wall surface facing the surface along the light-introducing opening 21b so as to be opposed to the light-introducing opening 21b (see FIG. 5).

The housing portion of the light-guiding means 11 is also provided with the rectangular-shaped opening 22b which allows the illumination light reflected by the reflective member 32 toward the side where the optical axis O is located to pass through and which fixes and supports the diffusion plate 33.

Furthermore, the housing portion of the light-guiding means 11 has the diffusion plate 33 as the diffusion member that diffuses the illumination light reflected by the reflective member 32. The diffusion plate 33 is the diffusion member that allows the reflected light (illumination light) from the reflective member 32 to transmit therethrough, to thereby cause the reflected light to diffuse.

The diffusion plate 33 is a plate member formed by a milky white semi-transparent member made of thin planar glass or acrylic resin, for example. The diffusion plate 33 is fixed to the main body member 22 so as to cover the opening 22b. In this case, the diffusion plate 33 is fixed by using a sticking member such as a double-sided tape 34, for example.

Furthermore, the housing portion of the light-guiding means 11 includes a light-shielding member 26 that is capable of switching between the full-open state in which the light-introducing opening 21b is optically open and the half-light-shielding state in which a part of the light-introducing opening 21b is shielded. The light-shielding member 26 is provided in the vicinity of the light-introducing opening 21b.

That is, the light-shielding member 26 is provided in the vicinity of the light-introducing opening 21b so as to be insertable into and removable from the optical path of the illumination light to be introduced from the light-introducing opening 21b. When the light-shielding member 26 is inserted into the optical path of the illumination light, the light-shielding member 26 functions as attenuation means that reduces the light amount of the illumination light introduced into the light-guiding means 11 by shielding a part of the light-introducing opening 21b.

Detailed description on the configuration of the light-shielding member 26 will be made below. The light-shielding member 26 is formed in a thin planar and somewhat elongated substantially strip shape, for example, and is pivotally supported with respect to the main body member 22 so as to be rotatable within a predetermined range, with one end portion of the light-shielding member 26 as a support shaft. To achieve such a configuration, the light-shielding member 26 includes a support hole 26a pierced on the one end portion. A support shaft of an opening state switching operation member 28 is inserted into the support hole 26a with the main body member 22 sandwiched between the opening state switching operation member 28 and the light-shielding member 26. That is, the support shaft of the opening state switching operation member 28 is inserted through a through hole 22c of the main body member 22, and thereafter fitted in the support hole 26a of the light-shielding member 26. Then, the light-shielding member 26 and the opening state switching operation member 28 are unified by a screw 29 with the main body member 22 sandwiched therebetween. With such a configuration, the light-shielding member 26 and the opening state switching operation member 28 are disposed so as to be rotatable around the support shaft of the opening state switching operation member 28.

The opening state switching operation member 28 is a dial or lever type operation member that is moved rotationally or swung within a predetermined range with the support shaft as the center, to thereby enable the light-shielding member 26 to rotationally move within a predetermined range. Therefore, the opening state switching operation member 28 is disposed so as to be rotationally movable or swingable with respect to the housing portion such that a part of the opening state switching operation member is exposed from the outer surface of the housing portion of the light-guiding means 11 of the illumination adapter 10.

According to the configuration, when the user rotationally moves or swings the opening state switching operation member 28 by manual operation, the light-shielding member 26 rotationally moves within a predetermined range. Specifically, when the user rotationally moves or swings the opening state switching operation member 28 in one direction by manual operation, the light-shielding member 26 moves to a position retreated from the optical path of the illumination light introduced from the light-introducing opening 21b, to be in the full-open state in which the light-introducing opening 21b is optically open. When the light-shielding member 26 is arranged at the position shown by the two-dot chain lines in FIGS. 7 to 10, the light-shielding member 26 is in the full-open state in which the light-shielding member 26 is retreated from the optical path of the illumination light to be introduced from the light-introducing opening 21b into the housing portion of the light-guiding means 11. In the full-open state, substantially entirety of the illumination light from the light-emitting portion 5 can be introduced from the light-introducing opening 21b into the housing portion of the light-guiding means 11. For example, FIG. 5 shows the full-open state of the light-shielding member 26. In this state, as shown with the arrow sign S in FIG. 5 (and FIG. 4), substantially entirety of the illumination light from the light-emitting portion 5 is introduced from the light-introducing opening 21b into the housing portion of the light-guiding means 11. The illumination light then advances toward the reflective member 32 (32a, 32b, 32c), to be reflected by the reflective member 32, and further advances toward the diffusion plate 33. Note that, since the light-shielding member 26 shown in FIG. 4 is retreated from the light-introducing opening 21b to the lower side of the direction vertical to the paper surface, the light-shielding member 26 does not shield the light flux shown with the arrow sign S.

On the other hand, if the user rotationally moves or swings the opening state switching operation member 28 in another direction by manual operation when the light-shielding member 26 is in the full-open state, the light-shielding member 26 can be switched to the half-light-shielding state in which the light-shielding member 26 shields a part of the light-introducing opening 21b, to shield a part of the illumination light introduced from the light-introducing opening 21b. When the light-shielding member 26 is arranged at the position shown by the dotted line (dashed line) in FIG. 7 and at the position shown by the solid lines in FIGS. 8 and 9, the light-shielding member 26 is in the state being inserted into the optical path of the illumination light so as to shield a part of the optical path of the illumination light to be introduced from the light-introducing opening 21b into the housing portion of the light-guiding means 11. In the present embodiment, the light-shielding member 26 is brought into the state covering substantially the half of the area of the light-introducing opening 21b. This state is referred to as the half-light-shielding state. In the half-light-shielding state, a part of the illumination light from the light-emitting portion 5 is shielded, and only the other part of the illumination light can be introduced from the light-introducing opening 21b into the housing portion of the light-guiding means 11. For example, FIG. 11 shows the half-light-shielding state of the light-shielding member 26. In this state, a part of the illumination light (substantially lower half portion of the illumination light) from the light-emitting portion 5 is shielded as shown by the arrow sign S2 in FIG. 11, whereas, as shown by the arrow sign S1 in FIG. 11, only the other part of the illumination light (substantially upper half portion of the illumination light) is introduced from the light-introducing opening 21b into the housing portion of the light-guiding means 11, advances toward the reflective member 32 (32a, 32b, 32c), to be reflected by the reflective member 32, and then advances toward the diffusion plate 33.

According to such a configuration, the opening state switching operation member 28 functions as an operation member that switches the light-introducing opening 21b between the full-open state and the half-light-shielding state. Therefore, the user appropriately operates the opening state switching operation member 28 as needed, to cause the light-shielding member 26 to be inserted into or removed from the optical path passing through the light-introducing opening 21b, to thereby enable the amount of illumination light to be adjusted. That is, the user operates the opening state switching operation member 28 to cause the light-shielding member 26 to be inserted into the optical path of the illumination light, to thereby be able to perform adjustment for reducing the amount of illumination light to be introduced into the light-guiding means 11.

Note that, as the situation where the user operates the opening state switching operation member 28 to reduce the amount of the illumination light to be introduced into the light-guiding means 11, for example, a situation can be considered in which, in a case where entirety of the illumination light from the light-emitting portion 5 is applied to the object at the time of image pickup of a proximate object through the use of the image pickup apparatus 1 to which the illumination adapter 10 is attached, the amount of the illumination light exceeds the range of the light emission adjustment of the light-emitting portion 5 by the image pickup apparatus 1, and as a result, a proper exposure amount cannot be obtained. In this case, due to a close distance to the desired object, a high reflectivity of the desired object, or the like, even if the image pickup apparatus 1 adjusts the amount of the illumination light, the amount of illumination light becomes excessive, which results in excessive exposure (overexposure). Therefore, the user operates the opening state switching operation member 28 to reduce the amount of the illumination light to be introduced into the light-guiding means 11. With such an operation, even under such a situation, proper amount of illumination light can be evenly applied to the object. As a result, deterioration of image quality can be prevented, and proper exposure amount can be obtained.

Note that the opening state switching operation member 28 and the light-shielding member 26 include a switch click mechanism 27 as a position restricting mechanism so that the rotational movement position or swinging position of the members is maintained at a predetermined plurality of positions (two positions in the present embodiment) within the operation range of the members.

The switch click mechanism 27 includes a plurality of click projection portions 26b provided in the vicinity of the support hole 26a of the light-shielding member 26, balls 30 provided on the main body member 22 side at the positions opposed to the click projection portions 26b, biasing springs 31 provided on the main body member 22 side and configured to press and bias the balls 30 toward the click projection portions 26, and the like. Note that a click mechanism as a common known technique is applied to the configuration of the switch click mechanism 27. Therefore, detailed illustration and description of the switch click mechanism will be omitted.

Thus, since the illumination adapter 10 according to the present embodiment is configured such that the opening state switching operation member 28 and the light-shielding member 26 include the switch click mechanism 27, the manual operation of the opening state switching operation member 28 enables the light-shielding member 26 to be switched between the full-open state and the half-light-shielding state, and enables the light-shielding member 26 to be maintained in each of the states when the light shielding member 26 is brought into each of the states.

Note that the click mechanism 27 is configured to maintain the light-shielding member 26 at two positions of the full-open state of the light-introducing opening 21b and the half-light-shielding state of the light-introducing opening 21b in the present embodiment. That is, the example is shown in which two click stop positions are set in the click mechanism 27 in the present embodiment.

Setting of the click stop positions of the click mechanism 27 is not limited to the above-described example (two positions), and three or more click stop positions can be set. In that case, the disposition number and disposition positions of the click projection portions 26b may be increased in accordance with desired click stop positions, for example.

The reflective main body 12 is mainly configured by the circular-ring-shaped reflective member 23. The circular-ring-shaped reflective member 23 includes, as described above, the opening 23a forming a part of the opening portion 10a that allows the image pickup opening 4b of the image pickup apparatus 1 to be exposed. Around the opening 23a (opening portion 10a), the tapered reflective surface 35 (reflective portion) formed so as to expand from the opening portion 10a to the object side (forward) for reflecting the diffused illumination light guided from the light-guiding means 11 to the object side (forward). The circular-ring-shaped reflective member 23 (reflective portion) is formed such that the normal line of the reflective surface 35 extends in the direction in which the image pickup optical axis O of the image pickup apparatus 1 is located.

Therefore, the circular-ring-shaped reflective member 23 as the main constituent member of the reflective main body 12 is a reflective portion including the opening 23a and the reflective surface 35.

Note that the reflective surface 35 is subjected to the surface finishing processing (for example, embossing processing) for enabling the illumination light to diffuse, and also subjected to coloring processing (for example, coloring processing by painting or printing) of white or milky white color for easy reflection of the illumination light. Apart from this, the circular-ring-shaped reflective member 23 itself may be formed by using a white colored resin material, for example.

In addition, on a part of the reflective surface 35, the opening 23b is formed at the region corresponding to the opening 22b and the diffusion plate 33 of the light-guiding means 11. The opening 23b is formed so as to have the area for allowing the diffusion plate 33 to expose. Note that the opening 23b is provided on a part of the reflective surface 35, as described above. The reflective surface 35 is formed in a tapered shape such that the diameter of the reflective surface 35 expands from the opening 23a. In addition, the reflective surface 35 is formed in a circular ring shape. Therefore, the reflective surface 35 itself is a curved surface in the circumferential direction of the opening 23a. On the other hand, the diffusion plate 33 is formed by using a thin planar member. The opening 23b is formed at a cutout portion 23c which is formed by cutting a part of the reflective surface 35, as shown in FIG. 6, for example.

Note that the configuration of the part of the opening 23b where the diffusion plate 33 is disposed is not limited to the above-described configuration, and the part may be configured by using a diffusion member having a surface of a shape same as the surface shape of the reflective surface 35, for example. In this case, there is no need for providing the cutout portion 23c.

In addition, as an alternative configuration, for example, a configuration can be considered in which only a part of the circular-ring-shaped reflective member 23, the part corresponding to the opening 23a, is formed so as to have a configuration similar to that of the diffusion member (made of a semi-transparent member and having a light diffusion function), and other parts of the circular-ring-shaped reflective member 23 are formed so as to have a configuration similar to that of the reflective surface 35 (made of white member and having a light diffusion reflection function), and then these parts are integrated.

With such a configuration, the illumination light reflected by the reflective member 32 of the light-guiding means 11 passes through the opening 22b and the opening 23b to be incident on the diffusion plate 33, and diffused by the diffusion plate 33. After that, the diffused illumination light is applied to a region surrounded by the reflective surface 35. The illumination light guided to the region surrounded by the reflective surface 35 is applied as-is toward the object side (forward), or diffused by the reflective surface 35 to be reflected toward the object side (forward).

Furthermore, in the circular-ring-shaped reflective member 23, the wall portion 21c of the mount member 21 is disposed in a protruded manner so as to extend toward the object side (forward) at the site of the boundary (that is, the peripheral edge portion of the opening 23a) of (between) the opening 23a (opening portion 10a) and the reflective surface 35.

In the example shown in the present embodiment, the wall portion 21c is disposed over the entire circumference of the opening portion 10a along the peripheral edge of the opening portion 10a of the illumination adapter 10 (the site of the boundary between the opening portion 10a and the reflective surface 35), the opening 10a being the opening 21a of the mount member 21, also the opening 22a of the main body member 22, and also the opening 23a of the circular-ring-shaped reflective member 23.

The wall portion 21c is a component provided for preventing the diffused illumination light applied from the diffusion plate 33 of the light-guiding means 11 to the region surrounded by the reflective surface 35 of the reflective main body 12 from directly entering the image pickup optical system 41.

The diffused illumination light coming out from the diffusion plate 33 to be applied to the region surrounded by the reflective surface 35 (hereinafter, shortly referred to as an inner region of the reflective surface 35) includes the components shown by the arrows (1), (2), and (3) illustrated by the one-dot chain lines in FIG. 4, for example. Among these arrows, the arrow (1) denotes the light component diffused by the diffusion plate 33, applied to the inner region of the reflective surface 35, and then advancing to the object side (forward), the arrow (2) denotes the light component diffused by the diffusion plate 33, applied to the inner region of the reflective surface 35, thereafter reflected by the part of the reflective surface 35, the part being located on the side opposed to the diffusion plate 33, and advancing to the object side (forward), and the arrow (3) denotes the light component diffused by the diffusion plate 33, applied to the inner region of the reflective surface 35, and thereafter advancing in the direction opposite to the object side (forward).

In this case, the light component denoted by the arrow (3) is likely to be directly incident on the image pickup optical system 41. Direct incidence of the illumination light on the image pickup optical system 41 causes flare or the like, which results in harmful light when forming an image including an object.

In order to address such a problem, the illumination adapter 10 according to the present embodiment includes the wall portion 21c provided around the peripheral edge of the opening portion 10a, to thereby surely shield the light component to be harmful light illustrated by the arrow (3) in FIG. 4 and prevent direct incidence of the illumination light on the image pickup optical system 41.

In FIG. 4, the optical path of the light component illustrated by the arrow (3) is assumed to advance along the two-dot chain line shown as the extension of the arrow (3) in FIG. 4, when the wall portion 21c is not provided. In contrast, since the illumination adapter 10 according to the present embodiment is provided with the wall portion 21c on the extended line of the arrow (3) in FIG. 4, the light component advancing in the direction illustrated by the arrow (3) is surely shielded by the wall portion 21c. Thus, with the illumination adapter 10 according to the present embodiment, the wall portion 21c provided around the peripheral edge of the opening portion 10a is capable of preventing the harmful light to be caused by the direct incidence of the diffused illumination light from the diffusion plate 33 on the image pickup optical system 41.

As described above, the wall portion 21c is disposed in a protruded manner so as to extend toward the object side (forward). In this case, the extension height H of the wall portion 21c (see the reference sign H in FIG. 4) is set so as not to shield the light component (see the arrow (1) in FIG. 4) directly applied toward the object side (forward) and the light component (the arrow (2) in FIG. 4) applied toward the reflective surface 35, among the light components of the diffused illumination light applied to the inner region of the reflective surface 35.

At the same time, the extension height H of the wall portion 21c is set so as not to interfere with the angle of view (see the reference sign AoV shown in FIG. 4) of the image pickup optical system 41 in the image pickup apparatus 1, that is, so as to prevent occurrence of mechanical vignetting.

Note that the configuration in which the wall portion 21c is provided over the entire circumference of the peripheral edge portion of the opening portion 10a is exemplified in the illumination adapter 10 according to the present embodiment. However, the wall portion 21c is not limited to such a configuration. The wall portion 21c has only to surely shield the light components advancing toward the image pickup optical system 41 among the light components of the diffused illumination light coming out from the diffusion plate 33. Therefore, the wall portion 21c is not necessarily provided over the entire circumference of the peripheral edge of the opening portion 10a, and has only to be provided at least in the vicinity of the diffusion plate 33.

That is, in the configuration (see FIG. 6, etc.) including the cutout portion 23c which is formed by cutting out a part of the reflective surface 35 of the circular-ring-shaped reflective member 23 in order to dispose the diffusion plate 33, the wall portion (21c) may be formed in a rib shape along the circumferential direction, at the site of the boundary of the cutout portion 23c and the opening 23a of the circular-ring-shaped reflective member 23, that is, between the cutout portion 23c and the opening 23a, so as to extend toward the object side within the range of the cutout portion 23c. In other words, the wall portion (21c) may be formed between the cutout portion 23c and the diffusion plate (diffusion portion) in a rib shape along the circumferential direction so as to extend toward the object side beyond the range of the cutout portion 23c. If such a configuration is employed, the wall portion (21c) may be formed integrally with (the cutout portion 23c of) the circular-ring-shaped reflective member 23, or may be formed on the mount member 21 side similarly as in the above-described embodiment.

In addition, the illumination adapter 10 is configured by the light-guiding means 11 and the reflective main body 12. However, the illumination adapter 10 according to the present embodiment is configured such that the light-guiding means 11 and the reflective main body 12 are integrated by combining the mount member 21, the main body member 22, and the circular-ring-shaped reflective member 23.

However, the configuration of the illumination adapter 10 is not limited to the example. For example, the light-guiding means 11 and the reflective main body 12 may be formed as separated bodies, and thereafter may be connected to each other. Furthermore, in this case, the parts corresponding to the mount member 21, the main body member 22, and the circular-ring-shaped reflective member 23 may be configured respectively by different members, or the parts corresponding respectively to the members (21, 22, and 23) may be integrated as one member.

When the illumination adapter 10 thus configured according to the present embodiment is attached to the image pickup apparatus 1, the illumination light emitted from the light-emitting portion 5 of the image pickup apparatus 1 is applied to the range of the one-dot chain line shown with the reference sign S in FIGS. 4 and 5. The illumination light comes out from the flash discharge tube 51 to be directly applied forward, then reflected by the illumination light reflector 52 to be applied forward, as shown in FIGS. 4 and 5. After that, the illumination light passes through the illumination light radiation window 53 to be diffused, and guided from the light-introducing opening 21b of the illumination adapter 10 into the inside of housing portion of the light-guiding means 11.

The illumination light guided to the inside of the housing portion of the light-guiding means 11 is reflected in every direction by the reflective member 32, and the reflected light eventually advances toward the openings 22b, 23b, passes through the diffusion plate 33 to be converted into diffused illumination light, and thereafter the diffused illumination light is guided into the inner region of the reflective surface 35.

A part of the diffused illumination light applied to the inner region of the reflective surface 35 is applied directly toward the object side (forward), and another part is diffused by the reflective surface 35 to be reflected toward the object side (forward). Furthermore, yet another part of the diffused illumination light is shielded by the wall portion 21c.

According to the embodiment as described above, in the illumination adapter 10 to be attached to the image pickup apparatus 1 including the light-emitting portion 5 for emitting the illumination light to the outside, the movable light-shielding member 26 configured to be switchable between the full-open state in which the light-introducing opening 21b is optically open and the half-light-shielding state in which a part of the light-introducing opening 21b is shielded is provided in the vicinity of the light-introducing opening 21b. The light-shielding member 26 is configured to be capable of being inserted into or retreated from the optical path of the illumination light introduced from the light-introducing opening 21b by the user appropriately operating the opening state switching operation member 28 as needed.

With such a configuration, when the user operates the opening state switching operation member 28 to insert the light-shielding member 26 into the optical path of the illumination light introduced from the light-introducing opening 21b (half-light-shielding state), the user can perform adjustment to reduce the amount of illumination light introduced from the light-introducing opening 21b and passing through the optical path. In addition, similarly, when the user operates the opening state switching operation member 28 to retreat the light-shielding member 26 from the optical path of the illumination light introduced from the light-introducing opening 21b (full-open state), substantially entire illumination light introduced from the light-introducing opening 21b is allowed to pass through.

Therefore, even in the case where the amount of the illumination light exceeds the range of the light amount adjustment of the illumination light by the image pickup apparatus 1 under the situation in which the amount of the illumination light becomes excessive even if the image pickup apparatus 1 adjusts the amount of the illumination light due to a close distance to the desired object, a high reflectivity of the desired object, or the like, the light amount adjustment of the illumination light can be performed, to thereby enable the illumination light of proper amount to be evenly applied toward the proximate object. As a result, proper exposure amount can be constantly obtained, which enables deterioration of image quality of an acquired image to be suppressed.

In addition, with the one embodiment, the illumination adapter 10 to be attached to the image pickup apparatus 1 including the light-emitting portion 5 for emitting the illumination light to the outside includes the wall portion 21c that shields the diffused illumination light directly incident on the image pickup optical system 41 is provided at the peripheral edge of the opening portion 10a corresponding to the image pickup opening 4b.

In this case, the extension height H of the wall portion 21c toward the object side (forward) is set so as to prevent vignetting of the angle of view of the image pickup optical system 41, and so as to be capable of surely shielding the diffused illumination light (harmful light) advancing from the diffusion plate 33 toward the image pickup optical system 41. Thus, the wall portion 21c is capable of surely preventing direct incidence of the diffused illumination light from the diffusion plate 33 on the image pickup optical system 41.

Such a configuration is thus capable of constantly suppressing occurrence of flare even when proximate image pickup is performed by using the illumination adapter 10, to thereby prevent the image quality of the acquired image from deteriorating and enable the illumination light of proper amount to be evenly applied to the proximate object. Thus, with the use of the illumination adapter 10 according to the present embodiment, an excellent image can be acquired constantly even in the proximate image pickup operation.

As described above, in the image pickup apparatus 1 to which the illumination adapter 10 according to the present embodiment is attached, the illumination light radiation window 53 of the light-emitting portion 5 is disposed on the front surface of the image pickup apparatus 1 in the region in the vicinity of the right upper corner when facing the image pickup apparatus 1. When the user performs image pickup operation with the image pickup apparatus 1 having the above-described front surface layout configuration held in his or her hand, in the normal case, it is natural for the user to hold the image pickup apparatus 1 by grasping a grip portion 6 provided on the position closer to the left side of the image pickup apparatus 1 with the right hand, while placing the left hand 100 on the region at the position closer to the right side of the image pickup apparatus 1 as shown in FIG. 12 (region shown with the reference numeral 2g in FIG. 12; hereinafter referred to as left-hand holding region).

As described above, the illumination adapter 10 according to the present embodiment is used by being attached to the image pickup apparatus 1. When the illumination adapter 10 is attached to the image pickup apparatus 1, the light-guiding means 11 of the illumination adapter 10 is arranged on the front surface of the image pickup apparatus 1 so as to cover the light-emitting portion 5 of the image pickup apparatus 1. At this time, the light-introducing opening 21b of the light-guiding means 11 is arranged at the position opposed to the illumination light radiation window 53 of the light-emitting portion 5 of the image pickup apparatus 1.

In this case, it is preferable that the housing portion of the light-guiding means 11, in particular, of the illumination adapter 10 attached to the front surface of the image pickup apparatus 1 does not occupy the left-hand holding region 2g shown in FIG. 12. If the housing portion of the light-guiding means 11 occupies the left-hand holding region 2g in FIG. 12, it is difficult for the user to hold the image pickup apparatus 1 to which the illumination adapter 10 is attached, which causes deterioration of usability. When an image of a proximate object is picked up, in particular, (that is, when image pickup is performed with the illumination adapter 10 according to the present embodiment attached), it is preferable to surely hold the image pickup apparatus 1 with both hands.

In view of such circumstances, the shape of the housing portion of the light-guiding means 11 in the illumination adapter 10 according to the present embodiment is formed to be substantially triangular shape when viewed from the front surface side (see FIG. 12). The housing portion of the light-guiding means 11 is formed in such a shape, the housing portion of the light-guiding means 11 of the illumination adapter 10 allows the left-hand holding region 2g of the image pickup apparatus 1 to be ensured as widely as possible, as shown in FIG. 12.

Specifically, in the case where the left hand 100 is put on the left-hand holding region 2g when holding the image pickup apparatus 1, for example, it is a natural form that the fingers (the index finger, in particular) of the left hand 100 are placed from the middle part of the left-hand holding region 2g to the vicinity of the right upper corner at which the light-emitting portion 5 is disposed, as shown in FIG. 12. In the illumination adapter 10 according to the present embodiment, in view of the arrangement of the left hand 100 at this time, the housing portion of the light-guiding means 11 is formed in the shape so as not to interfere with the left hand 100 as much as possible. That is, the shape of the housing portion of the light-guiding means 11 is formed in substantially the triangular shape when viewed from the front surface side, and an oblique side 11a as a first side, which is one of the sides of the triangular shape, is formed at the position along the fingers (the index finger, in particular) of the left hand 100 put on the image pickup apparatus 1, as shown in FIG. 12.

In addition, also an upper side 11b as a second side closer to the top surface, which is one of the two sides facing the oblique side 11a in the substantially triangular shape of the housing portion of the light-guiding means 11, is formed so as to be substantially parallel with the line along the top surface of the image pickup apparatus 1. The oblique side 11a and the upper side 11b intersect with each other in the vicinity of the opening state switching operation member 28 in the housing portion of the light-guiding means 11. In addition, the other side of the two sides facing the oblique side 11a is a third side provided at the site contacting the circular arc of the reflective main body 12, and denoted with the reference sign 11c. The third side 11c intersects with both of the oblique side 11a and the upper side 11b in the vicinity of the outer peripheral edge portion of the reflective main body 12. Therefore, the third side 11c is brought into contact with or enclosed in the outer peripheral circular arc shape of the reflective main body 12.

With such a configuration, when the illumination adapter 10 is attached to the image pickup apparatus 1, the housing portion of the light-guiding means 11 is formed so as not to protrude upward from the top surface of the image pickup apparatus 1.

The light-shielding member 26 is configured to rotate or swing within the predetermined range, with the support shaft of the opening state switching operation member 28 as a rotation center, inside the light-guiding means 11, as described above. Therefore, when the light-shielding member 26 is brought into a full-open state, the light-shielding member 26 is rotated toward the lower surface side of the image pickup apparatus 1 so as to be retreated from the optical path of the illumination light of the light-emitting portion 5. Such a configuration prevents the size increase of the entire apparatus when the illumination adapter 10 is mounted.

In addition, as described above, the shape of the housing portion of the light-guiding means 11 is formed in substantially the triangular shape and the light-shielding member 26 is configured to rotate toward the lower surface side (that is, toward the oblique side 11a) in the full-open state (retreated from the optical path), and also the shape of the light-shielding member 26 itself is devised as described below.

In the above description, the light-shielding member 26 is just described to have a somewhat elongated strip shape. More precisely, the light-shielding member 26 is formed in a shape as described below. That is, when the light-shielding member 26 is in the half-light-shielding state, the upper side of the light-shielding member 26 is substantially parallel with the line along the top surface of the image pickup apparatus 1. In addition, when the light-shielding member 26 is in the full-open state, that is, when the light-shielding member 26 is at the position retreated from the optical path, the lower side of the light-shielding member 26 is substantially parallel with the oblique side of the housing portion of the light-guiding means 11. The lower side of the light-shielding member 26 is thus formed by the oblique side, which enables the light-shielding member 26 that rotates inside the housing portion to ensure a larger rotation angle while avoiding the inner components, and at the same time, the size and movable range of the light-shielding member 26 can be ensured. Thus, the necessary size of the light-shielding member 26 can be ensured, which can enhance the light-shielding effect, that is, attenuation function by inserting or retreating the light-shielding member 26 into or from the optical path of the illumination light.

Thus, the shape of the housing portion of the light-guiding means 11 is devised in the illumination adapter 10 according to the present embodiment. With such a devise, the holding of the image pickup apparatus 1 is not interfered with and usability is not impaired even when the illumination adapter 10 is mounted. As a result, the user can use the image pickup apparatus 1 in a natural form without feeling a sense of incongruity.

Note that the present invention is not limited to the above-described embodiment, and it is needless to say that various modifications and applications are possible within a range without departing from the gist of the invention. Furthermore, the respective embodiments include inventions in various stages, and various inventions can be extracted by appropriately combining a plurality of disclosed constituent elements. For example, even if some constituent elements are deleted from all the constituent elements shown in the embodiment, if a problem to be solved by the invention can be solved and the effects of the invention can be obtained, the configuration from which the constituent elements are deleted can be extracted as the invention. Furthermore, the constituent elements can be appropriately combined over different embodiments. The invention is not limited by a particular embodiment except by the appended claims.

The present invention is not limited only to the image pickup apparatus specialized for the image pickup function, and can be widely applied to another type of electronic instrument provided with an image pickup function, for example, an electronic instrument provided with various kinds of image pickup functions such as a digital camera, movie camera, a mobile phone, a smart phone, an electronic notebook, an electronic dictionary, a mobile data terminal, a personal computer, a tablet type terminal equipment, a game instrument, a television receiver, a clock, a navigation instrument using a GPS (global positioning system), etc.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An illumination apparatus comprising:
a light-guiding portion including a light-introducing opening through which light is introduced from a light-emitting portion provided to an image pickup apparatus, the light emitting portion being configured to apply light to an external object, a reflective surface that reflects illumination light introduced from the light-introducing opening toward an image pickup optical axis of the image pickup apparatus, and a diffusion portion that diffuses the illumination light reflected by the reflective surface toward an object side as diffused illumination light, to cause a part of the diffused illumination light to cross photographing light; and
a reflective body including an opening portion that allows an image pickup opening of the image pickup apparatus to be exposed, and a reflective portion provided around the opening portion and including a reflective surface formed so as to expand from the opening portion toward the object side for reflecting the diffused illumination light which is guided from the light-guiding portion toward the object side and which crossed the photographing light, wherein the diffusion portion is disposed at a part of the reflective portion and the reflective body further includes a wall portion formed at a boundary between the opening portion and the diffusion portion so as to extend to the object side, the wall portion further extending so as to overlap with a part of a length of the diffusion portion along a photographing optical axis.

2. The illumination apparatus according to claim 1, further comprising,
a light-shielding member provided in the vicinity of the light-introducing opening and configured to be switchable between a full-open state in which the light-introducing opening is optically open and a half-light-shielding state in which a part of the light-introducing opening is shielded.

3. The illumination apparatus according to claim 2, wherein the light-guiding portion includes an opening state switching operation member configured to switch the full-open state and the half-light-shielding state by manual operation.

4. The illumination apparatus according to claim 3, wherein the opening state switching operation member is located at a position where a distance between the opening of the reflective body and the opening state switching operation member is longer than a distance between the opening of the reflective body and the light-introducing opening.

5. The illumination apparatus according to claim 3, wherein the opening state switching operation member is a dial operation member that allows rotational movement of the light shielding member by manual operation.

6. The illumination apparatus according to claim 4, wherein, when the illumination apparatus is mounted to an image pickup apparatus including a photographing optical system arranged at a front of the image pickup apparatus when viewing the image pickup apparatus from the front and a light-emission window for object illumination arranged at a position lateral to and upper than the photographing optical system, the photographing optical system of the image pickup apparatus is arranged in the opening of the reflective body and the light-introducing opening covers a front surface of the light-emission window for object illumination of the image pickup apparatus.

7. The illumination apparatus according to claim 1, wherein the diffusion portion has a surface whose shape is same as a shape of the reflective portion.

8. The illumination apparatus according to claim 1, wherein the reflective portion is formed such that a normal line of the reflective surface of the reflective portion extends in a direction in which the image pickup optical axis of the image pickup apparatus is located.

9. The illumination apparatus according to claim 1, wherein
the opening portion is formed in a circular shape around the image pickup opening of the image pickup apparatus, and
the reflective portion is formed such that a diameter of the reflective portion expands from a peripheral edge of the opening portion.

10. The illumination apparatus according to claim 1, wherein the reflective portion has a surface for diffusing light.

11. An illumination apparatus comprising:
a housing portion that illuminates light for illuminating an object, the light being emitted from an external image pickup apparatus, as diffused light, in a direction in which an image pickup optical axis of the external image pickup apparatus is located and causes the diffused light to cross photographing light;
a ring-shaped reflective body including an opening formed so as to surround the image pickup optical axis of the external image pickup apparatus and an emission surface from which the diffused light is emitted, the emission surface being formed at a part of the ring-shaped reflective body, the ring-shaped reflective body being configured to cause a part of the diffused light which crossed the photographing light to reflect toward the object; and
a light-shielding wall provided between a peripheral edge portion of the opening and the emission surface and extending in an optical axis direction, the light-shielding wall further extending so as to overlap with a part of a length of the diffusion portion along a photographing optical axis.

12. The illumination apparatus according to claim 11, wherein the light-shielding wall is located outside an angle of view of the image pickup apparatus and has an extension height not to interfere with application of the diffused illumination light diffused by the diffusion portion toward the reflective portion.

13. The illumination apparatus according to claim 11, further comprising a connection mechanism for attaching the illumination apparatus to the external image pickup apparatus.

14. The illumination apparatus according to claim 13, wherein the connection mechanism is configured by a bayonet mechanism.

15. An illumination apparatus configured to be attached to an image pickup apparatus including a light-emitting portion for applying illumination light to outside, the illumination apparatus comprising:
a light-guiding unit including a light-introducing opening through which light is introduced from the light-emitting portion, a reflective portion that receives the illumination light introduced from the light-introducing opening and reflects the received illumination light toward an image pickup optical axis of the image pickup apparatus, and a diffusion portion which diffuses, to outside, the illumination light reflected by the reflective portion and causes the diffused illumination light to cross photographing light;

a reflective main body including an opening portion that allows an image pickup opening of the image pickup apparatus to be exposed, a reflective portion provided around the opening portion and including a reflective surface formed so as to expand from the opening portion toward an object side for reflecting the diffused illumination light which is guided from the light-guiding unit toward the object side and which crossed the photographing light, a cutout portion formed by cutting a part of the reflective portion so as to dispose the diffusion portion, and a rib-shaped wall portion formed at a boundary between the opening portion and the cutout portion so as to extend to the object side, the rib-shaped wall portion further extending so as to overlap with a part of a length of the diffusion portion along a photographing optical axis.

16. The illumination apparatus according to claim 15, wherein the wall portion is located outside an angle of view of the image pickup apparatus and has an extension height not to interfere with application of the diffused illumination light diffused by the diffusion portion toward the reflective portion.

17. An image pickup system configured by an image pickup apparatus and an illumination apparatus configured to be attachable to and detachable from the image pickup apparatus, the image pickup system comprising:

an image pickup apparatus including on a front surface thereof a photographing optical system and a light-emission window for object illumination; and an illumination apparatus comprising:

a light-guiding unit including a light-introducing opening through which illumination light from the light-emitting portion is introduced, a reflective portion that receives the illumination light introduced from the light-introducing opening and reflects the received illumination light toward an image pickup optical axis of the image pickup apparatus, and a diffusion portion which diffuses the illumination light reflected by the reflective portion and causes the diffused illumination light to cross photographing light; and a reflective main body including an opening portion that allows an image pickup opening of the image pickup apparatus to be exposed, a reflective portion provided around the opening portion and including a reflective surface formed so as to expand from the opening portion toward an object side for reflecting diffused illumination light which is guided from the light-guiding unit toward the object side and which crossed the photographing light, a cutout portion formed by cutting a part of the reflective portion so as to dispose the diffusion portion, and a rib-shaped wall portion formed at a boundary between the opening portion and the cutout portion so as to extend to the object side, the rib-shaped wall portion extending so as to overlap with a part of a length of the diffusion portion along a photographing optical axis.

18. The image pickup system according to claim 17, wherein the wall portion is located outside an angle of view of the image pickup apparatus and has an extension height not to interfere with application of the diffused illumination light diffused by the diffusion portion toward the reflective portion.

* * * * *